United States Patent [19]
LaPlante

[11] Patent Number: 5,628,227
[45] Date of Patent: May 13, 1997

[54] METHOD AND APPARATUS FOR DETERMINING AT LEAST ONE SHEET STRETCH VALUE OF A ROLL OF MATERIAL

[75] Inventor: Benoit LaPlante, Sherbrooke, Canada

[73] Assignee: HTRC Automation Inc., Bromptonville, Canada

[21] Appl. No.: 319,286

[22] Filed: Oct. 6, 1994

[51] Int. Cl.$^6$ ................................................ G01L 5/04
[52] U.S. Cl. ........................................ 73/159; 73/862.392
[58] Field of Search ................................ 73/159, 862.44, 73/862.392, 862.55, 829, 858, 800, 841, 838, 826

[56] References Cited

U.S. PATENT DOCUMENTS

| | | |
|---|---|---|
| 3,161,043 | 12/1964 | Pundyk . |
| 3,472,439 | 10/1969 | De Hertel Eastcott ................ 226/195 |
| 3,699,809 | 10/1972 | Komatsu .................... 73/143 |
| 3,747,748 | 7/1973 | Kiley et al. . |
| 4,347,993 | 9/1982 | Leonard ................... 242/75.51 |
| 4,532,500 | 7/1985 | Henk ...................... 340/675 |
| 4,823,608 | 4/1989 | Satoh ...................... 73/783 |
| 4,865,872 | 9/1989 | Pellatiro ................... 73/159 X |
| 4,947,685 | 8/1990 | Montgomery et al. ............. 73/159 |
| 4,974,442 | 12/1990 | Ives et al. ................. 72/862.55 X |
| 4,984,458 | 1/1991 | Montgomery et al. ............ 73/159 |
| 5,182,722 | 1/1993 | Hain ....................... 73/159 X |

FOREIGN PATENT DOCUMENTS

| | | |
|---|---|---|
| 0270772A2 | 6/1988 | European Pat. Off. . |
| 0603062A1 | 6/1994 | European Pat. Off. . |
| 2933329 | 3/1981 | Germany . |
| 3611945 | 10/1987 | Germany . |
| 4008282 | 9/1991 | Germany . |

*Primary Examiner*—Elizabeth L. Dougherty
*Attorney, Agent, or Firm*—Merchant, Gould, Smith, Edell, Welter & Schmidt, P.A.

[57] ABSTRACT

There are provided a method and an apparatus for determining at least one sheet stretch value of a roll of material. The method comprises the steps of (a) radially marking one side end of the roll from periphery thereof to produce a series of aligned marks along a radius thereof; (b) supporting the roll in such a manner that it is free to rotate, thus allowing relaxation of peripheral layers thereof; and (c) after steps (a) and (b), measuring a lateral shifting value GAP of one of the marks, which is the outermost in periphery of the roll, with respect to an adjacent mark.

16 Claims, 6 Drawing Sheets

METHOD AND APPARATUS FOR DETERMINING AT LEAST ONE SHEET STRETCH VALUE OF A ROLL OF MATERIAL

FIELD OF THE INVENTION

The present invention relates to a method and an apparatus for determining at least one sheet stretch value of a roll of material.

PRIOR ART

Before the production of a roll of material customized in size to a client's specifications, a large roll of paper is first manufactured at a paper machine and is then brought to a winder to be processed. Basically, the winder is for producing smaller rolls customized in size to the client's specifications from a large roll. During the winding process, the sheet of material is stretched as the roll is wound in order to produce a harder roll which will better resist the transportation to the client's location. The sheet stretch profile in regard of the diameter of the roll must be as even as possible. Any disturbances in the tension profile of the roll will show when the client unwinds the roll.

It is of great value to measure the sheet stretch value with respect to the diameter of the roll. The profile of the sheet stretch values along the diameter should be as even as possible in order to prevent disturbances at the client location.

Known in the art, there is the U.S. Pat. No. 3,161,043 of J. PUNDYK in which there is described a method and apparatus for use in ascertaining web strain in a wound roll. The method comprises cutting the outermost non-loosened turn of the web material completely there-across to relieve the strain in said turn and thereby permit said turn to assume a reduced length as in non-strained condition, and comparing said reduced length to the circumference of the wound roll.

The method described above is a manual time-consuming method where the operator has to cut the outermost non-loosened turn of material completely there-across, and then compare the reduced length to the circumference of the wound roll. These two steps have to be repeated regularly as the roll is unwound in order to take measures for different diameter values. As each measure requires a certain amount of time and energy from the operator, the measures are limited to a reduced number of diameter values.

The gap test method described above is a common method to measure the sheet stretch profile of a roll of paper. Basically, a very sharp blade is used to tear across the roll the very last layer or sheet of paper so that a gap is formed. By precisely measuring this gap and the diameter of the roll, the percentage of stretch of the sheet is calculated for that given diameter. To explain further, please look at the following example where gap length is 6 mm, and roll diameter is 1,000 mm. The stretch residual tension STR(%) is calculated with the following equations:

$$STR(\%) = 100 \times \frac{GAP\ LENGTH}{(ROLL\ DIAMETER \times \pi)}$$

$$STR(\%) = 100 \times \frac{6\ mm}{1000\ mm \times \pi}$$

$$STR(\%) = 0.19098$$

The stretch residual tension for a gap length of 6 mm on a 1000 mm diameter roll is then 0.19098%. The measurement of the sheet stretch along the radius of a roll requires the measurement of multiple points. Usually, the measurement of thirty to forty points spread evenly over the roll's diameter requires two to four hours. It is a tenuous job as it requires to manually cut the paper off the roll. The resolution of the manual reading which is around 30 to 40 points is very low compared to the total number of turns of paper in a typical roll of paper which is about 5000 to 8000 layers of paper. Also, the gap length is read with a magnifier glass combined with a transparent ruler. The readings are more or less precise depending on the person who makes the measurement. Those different factors make it almost an empirical method of testing the rolls.

Also known in the art, there are the following U.S. Pat. Nos.:

3,472,439

3,699,809

4,347,993

4,532,500

4,823,608

An object of the present invention is to provide a method and an apparatus for determining at least one sheet stretch value of a roll of material, which are faster and more precise than the ones of the prior art, and which can provide rapidly sheet stretch values with respect to different diameter values with a high resolution.

SUMMARY OF THE INVENTION

According to the present invention, there is provided a method for determining at least one sheet stretch value of a roll of material with respect to a corresponding diameter thereof, comprising the steps of:

(a) radially marking one side end of said roll from periphery thereof to produce a series of aligned marks along a radius thereof;

(b) supporting said roll in such a manner that said roll is free to rotate, thus allowing relaxation of peripheral layers thereof; and (c) after said steps (a) and (b), measuring a lateral shifting value GAP of one of said marks, which is the outermost in periphery of said roll, with respect to an adjacent mark of said marks.

According to the present invention, there is also provided an apparatus for determining at least one sheet stretch value of a roll of material, one side end of said roll being radially marked from periphery thereof to produce a series of aligned marks along a radius thereof, said apparatus comprising:

supporting means for supporting said roll in such a manner that said roll is free to rotate, thus allowing relaxation of peripheral layers thereof; and first measuring means for measuring a lateral shifting value GAP of one of said marks, which is the outermost in periphery of said roll, with respect to an adjacent mark of said marks.

3

Figure 3:
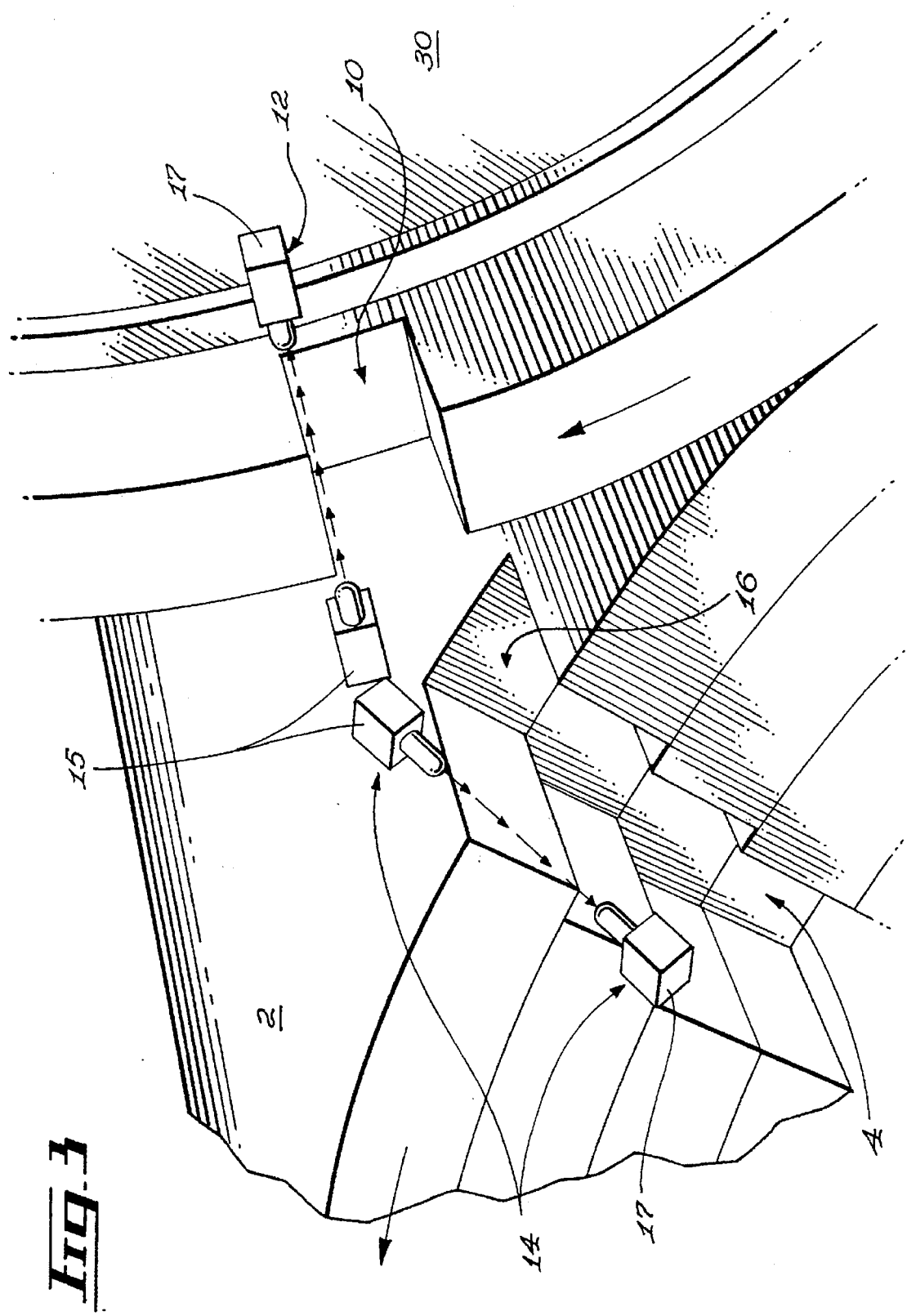
FIG. 3 is an enlarged perspective view of a portion of FIG. 2 showing additionally optical sensors.
Figure 4:
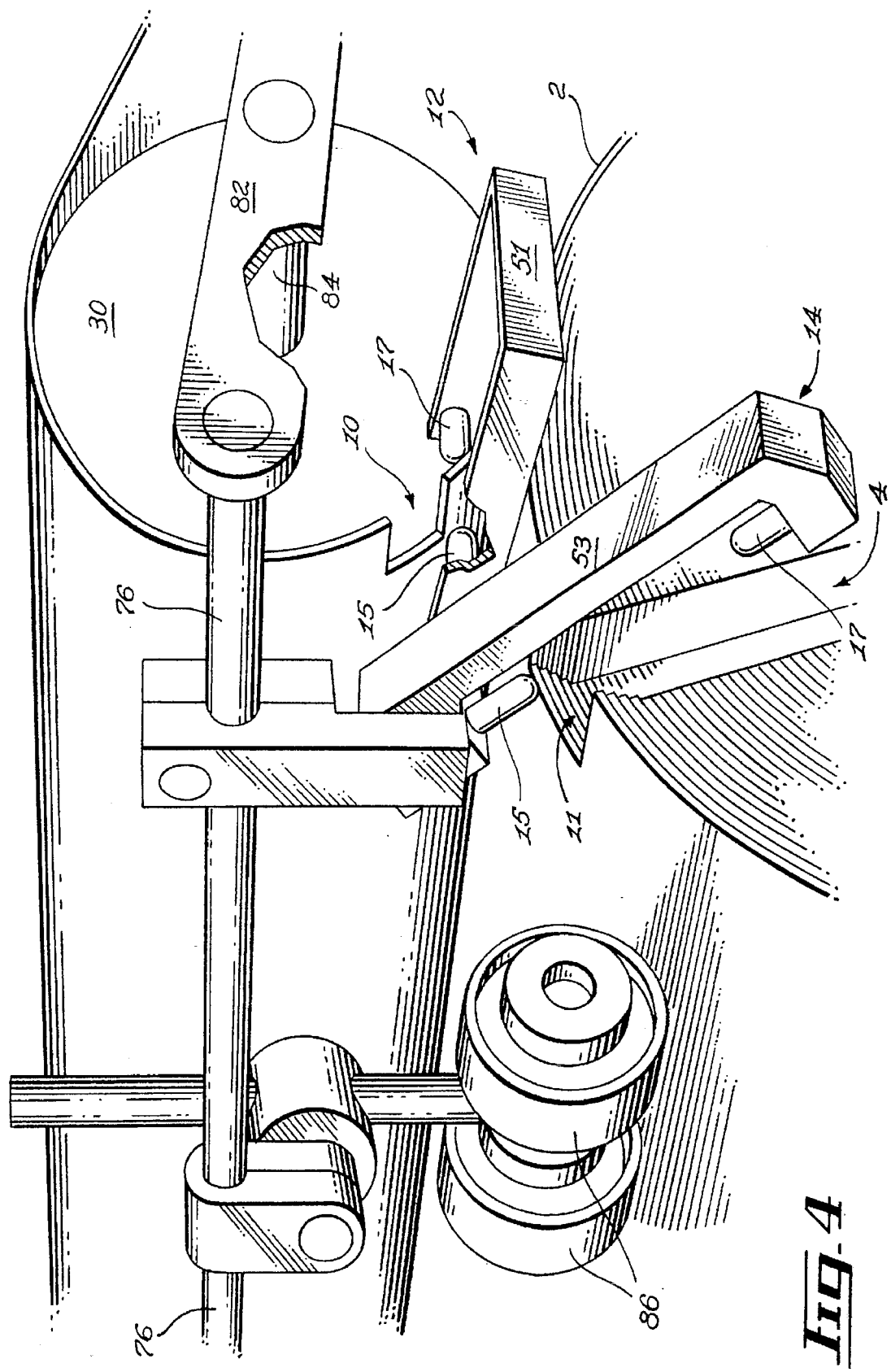
Figure 5:
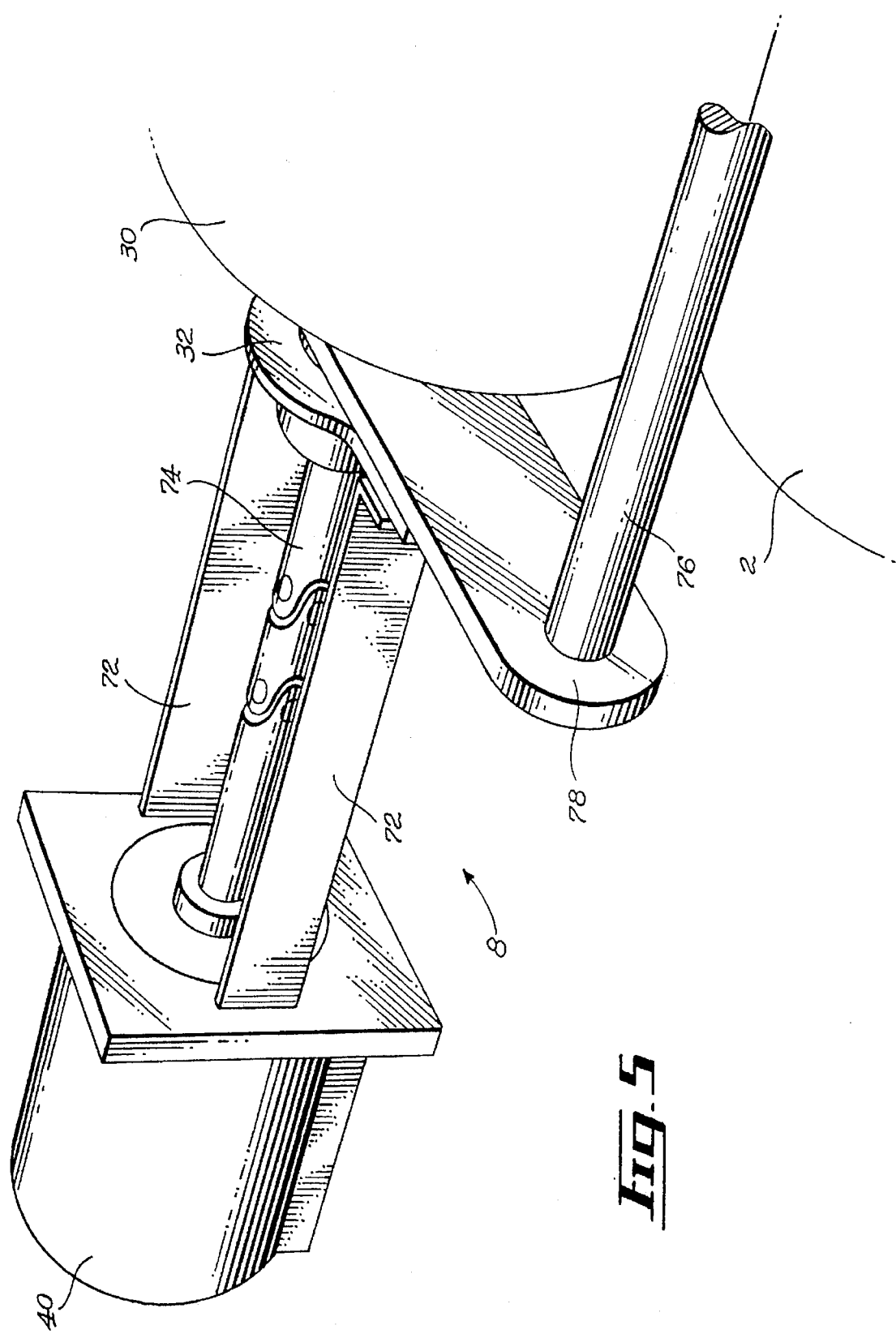
Figure 6:
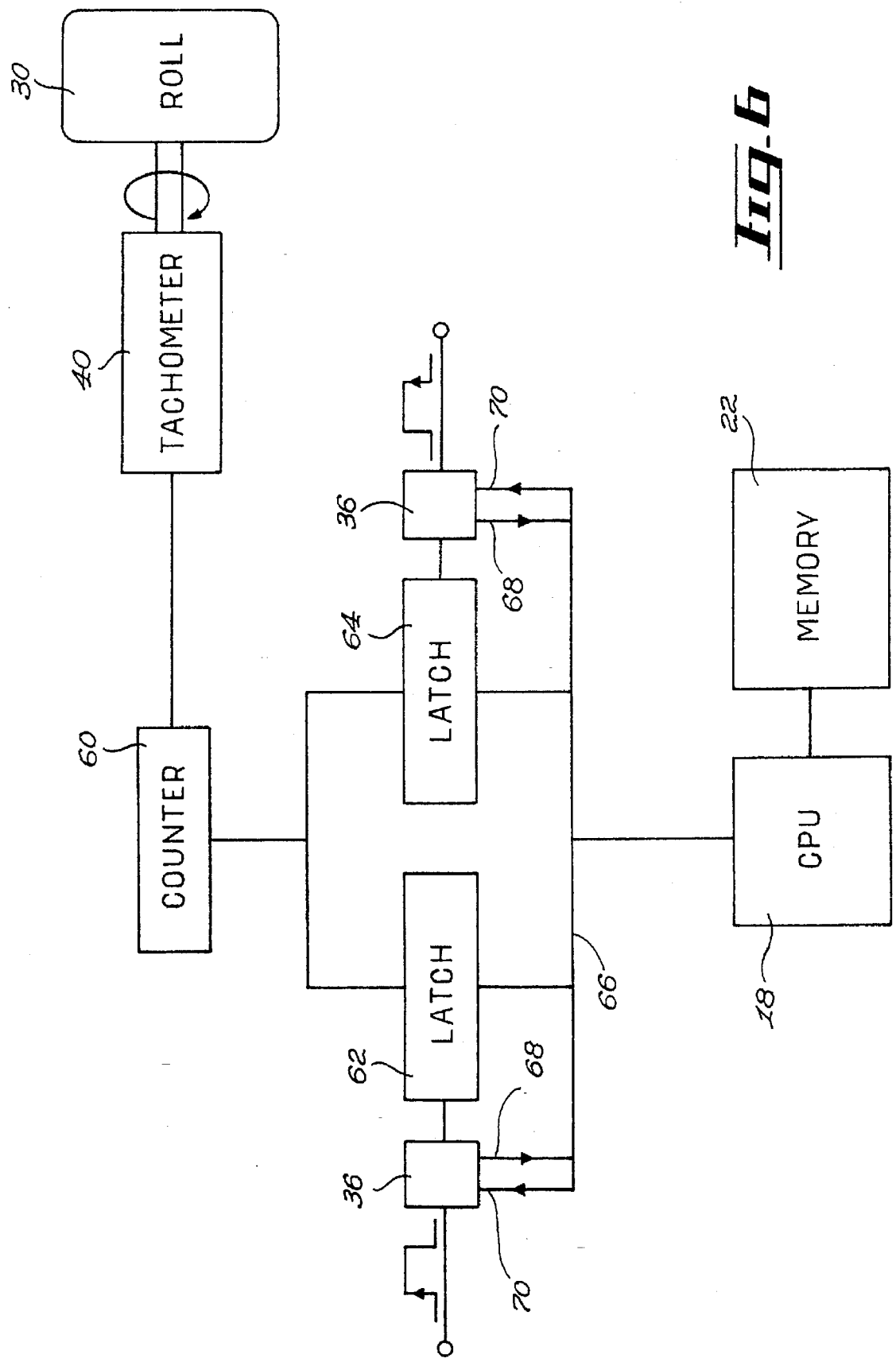
Figure 7:
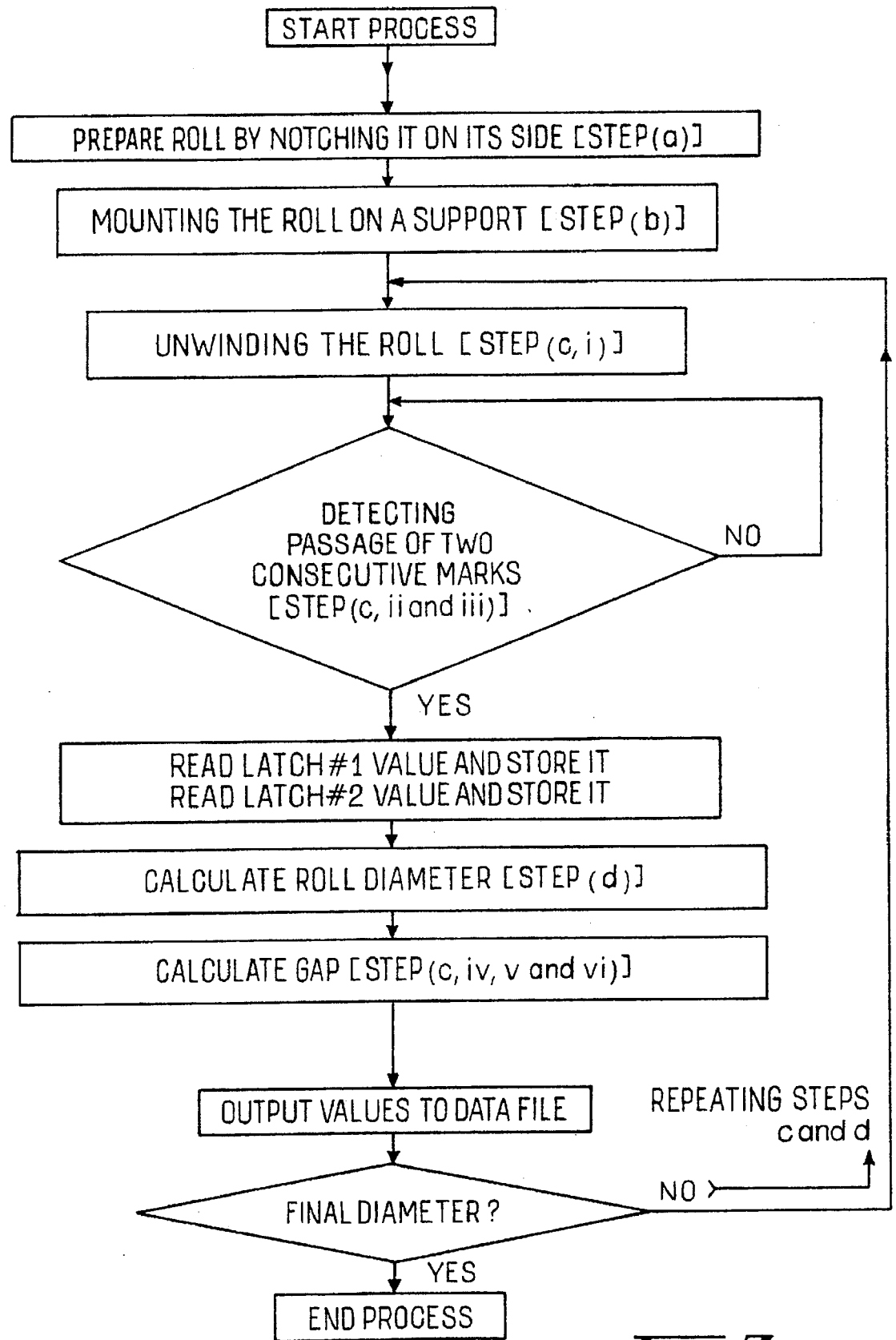

FIG. 4 is a perspective view showing a support for supporting the optical sensors shown in FIG. 3, according to a preferred embodiment of the invention;

FIG. 5 is a perspective view of a tachometer with appropriate coupler, and a partial perspective view of a roll of material with a roller according to a preferred embodiment of the invention;

FIG. 6 is a block diagram showing parts of an apparatus according to a preferred embodiment of the present invention; and FIG. 7 is a flow chart diagram illustrating a method according to a preferred embodiment of the present invention.

DETAILED DESCRIPTION OF THE DRAWINGS

Figure 1:
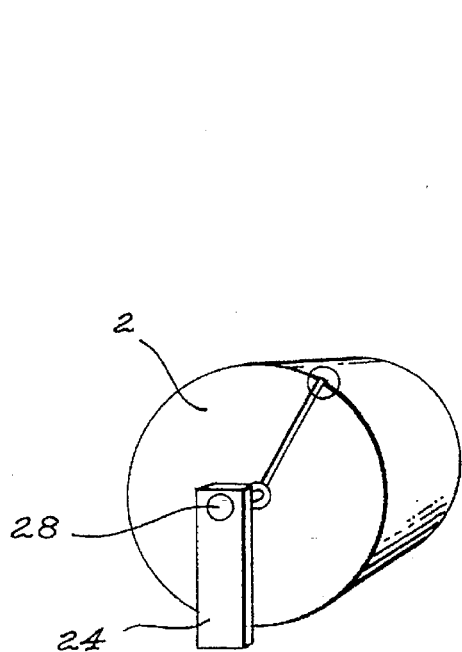
FIG. 1 is a schematic perspective view of a roll of material after the marking of the roll.
Figure 1A:
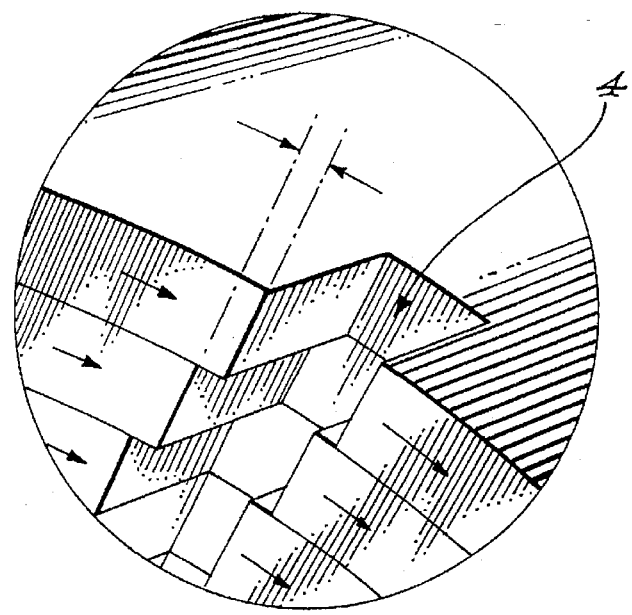
FIG. 1a is an enlarged perspective view of a portion of FIG. 1, detailing the marking of the roll.

Referring now to FIGS. 1 to 6, there is shown an apparatus according to the present invention for measuring at least one sheet stretch value of a roll of paper. By automating the reading with the apparatus of the present invention, precision, repeatability and reliability of the results are increased. The roll is prepared for the analysis by notching it (4) on its side as shown in FIGS. 1 and 1a. Then, the sheet of the roll is run through the apparatus shown in FIG. 2 to measure sheet stretch values.

Figure 2:
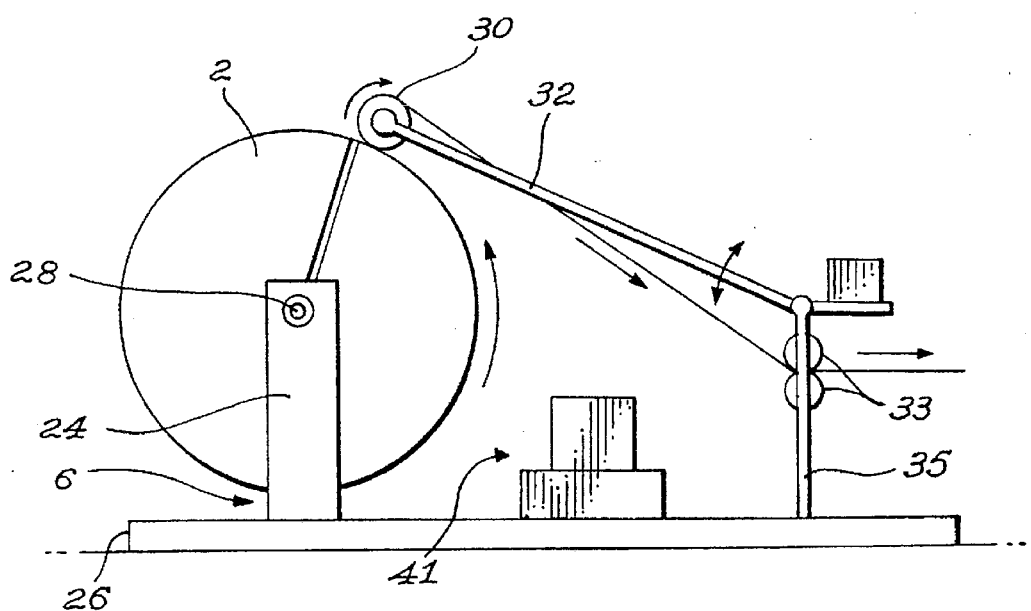
FIG. 2 is a side view of certain elements of an apparatus according to the present invention, with a roll of material.

The apparatus comprises a supporting means, such as for example a vertical support (6), for supporting the roll (2) in such a manner that it is free to rotate, thus allowing relaxation of peripheral layers thereof, as shown in FIG. 2; and a first measuring means, such as for example a measuring unit, for measuring a lateral shifting value GAP of one (10) of the marks (4), which is the outermost in periphery of the roll (2), with respect to an adjacent mark of the marks (4), the elements of this first measuring unit being described later. The apparatus may also comprise a second measuring means, as for example a measuring unit for measuring the diameter of the roll (2), the elements of this second measuring unit being described later. The value GAP is representative of the sheet stretch value of the roll (2) at said diameter.

As shown in FIG. 2, the paper roll (2) is placed on the support (6). A steel roller (30) is mounted on bearings which are supported by a swing arm (32). The roller (30) is resting on the paper roll (2). The swing arm (32) is counterbalanced so that only a small residual weight of per example, one to two lbs is applied to the paper roll (2). The paper sheet is picked up by the roller (30) and pulled at constant speed by the motor driven rollers (33). As the paper roll (2) is unrolled, its diameter reduces and the swing arm (32) keeps the steel roller (30) in contact with the paper roll (2). A computer (41) is connected to the different sensors to calculate and memorize the results.

Referring again to FIGS. 1 to 6, the first measuring unit comprises:

unwinding means, such as an unwinding apparatus embodied by the motor driven rollers (33), for unwinding a portion of the material which includes the mark (10) which is the outermost in periphery of the roll (2);

first detecting means, such as a first optical sensor (12) for detecting passage, at a first position, of the mark (10) which is in the portion of material, and producing a signal A with respect to time accordingly;

second detecting means, as for example a second optical sensor (14) for detecting passage, at a second position, of a second mark (16) shown in FIG. 3 which is immediately subsequent to the mark (10) and located in periphery of the roll (2), and producing a signal B with respect to time accordingly;

4 comparing means such as a comparator embodied by the CPU (18) shown in FIG. 6, for comparing the signals A and B with respect to time to obtain a period of time $\Delta t$, determining which of the signals A and B occurred first and establishing a polarity value P accordingly;

evaluating means as, for example, an evaluating unit embodied by the CPU (18), for measuring a length of material LM unwound during the period of time $\Delta t$; and a first calculating means such as a calculating unit embodied by the CPU (18), for calculating the value GAP by means of the following equation GAP=P*LM+OV, where OV is an offset value determined by relative location of the first and second positions.

The optical sensors (12 and 14) are attached to the steel roller (30). For the clarity of the illustration of FIG. 3, the brackets holding the optical sensors (12 and 14) are not shown in this FIG. 3. These brackets are shown in FIG. 4. They are mechanically connected to the swing arm (32). Each of the two optical sensors (12 and 14) comprises an emitter (15) and a detector (17).

A tachometer (40) such as the high resolution pulse generator shown in FIG. 5 is attached to the steel roll (30), for measuring precisely its rotation. The tachometer (40) typically generates 5000 pulses/revolution. The optical sensor (12) is located at the end of the steel roller 30, and detects the first edge of a notch in the paper sheet as it is unrolled toward steel roller (30). The emitter (15) of the sensor (12) emits a narrow beam of light which is detected by the corresponding detector (17) when a notch in the paper is passing by. The second sensor (14) detects the first edge of the outermost peripheral notch of the paper sheet on the roll (2).

The support (6) comprises two parallel upright members (24), only one of the members being shown in FIGS. 1 and 2 but it can be easily understood that there is another upright member on the other side of the roll (2). The upright members (24) are mechanically connected by means of a base plate (26), each of the upright members (24) having an upper section provided with a ball bearing (28) for supporting a center axis of the roll (2), whereby, in operation, the roll (2) is mounted between the upright members (24).

The apparatus further comprises a calculating means, as for example a calculating unit, embodied by the CPU (18) for calculating a percentage of stretch STR(%) for a corresponding diameter value of the roll (2) measured by the second measuring unit by means of the following equation:

$$STR(\%) = \frac{[\text{said value gap}] * 100}{\pi * [\text{the corresponding diameter value of said roll}]}$$

The first measuring unit comprises the steel roller (30) which has a given side diameter $D_1$. The roller (30) is mountable onto a support such as the swing arm (32) so that, in operation, the roller (30) is parallel to the roll (2), the unwound portion of material is disposed around at least a portion of the roller (30), and the roller (30) is free to rotate, thus allowing relaxation of peripheral layers thereof, as the portion of material is unwound.

The first measuring unit also comprises:

the tachometer (40) which is connected to the roller (30), the tachometer (40) generating a predetermined number of pulses NP for a complete rotation of the roller (30);

third detecting means, such as a third sensor embodied by the CPU (18), connected to the first and second optical sensors (12 and 14) and to the tachometer (40), for detecting a number of pulses N1 generated by the tachometer (40) during the period of time Δt; and a second calculating means, such as for example a calculating unit embodied by the CPU (18) for calculating the length LM of material by means of the following equation $$LM = N1*[(D_1*\pi)/NP].$$

The second measuring unit comprises:

fourth detecting means, as for example a fourth sensor embodied by the CPU (18), connected to the second sensor (14) and to the tachometer (40), for detecting a number of pulses N2 generated by the tachometer (40) during a period of time Δt determined by two successive passage detections at the second position; and third calculating means, such as for example another calculating unit embodied by the CPU (18) for calculating the diameter $D_2$ of the roll (2), by means of the following equation $$D_2 = [(N2*D_1)/NP].$$

The comparator is provided by the computer (41) which comprises the CPU (18), the memory (22) and interface devices such as trigger latches (36) for receiving signals from optical sensors (12 and 14). The third and fourth sensors are provided by the CPU (18) and the trigger latches (36) which receive signals from optical sensors (12 and 14) and from the tachometer (40).

Referring now to FIGS. 3 and 4, the sensor (12) comprises an emitter (15), a detector (17) and a C-clamp bracket (51) keeping emitter (15) and detector (17) aligned with each other and in proper position. The sensor (14) comprises also an emitter (15), a detector (17) and a C-clamp bracket (53). The sensor (12) is for detecting the edge of notch (10) and the sensor (14) is for detecting the edge of notch (16). Both C-clamp brackets (51 and 53) are mounted together by means of a small shaft (76) attached by a bracket (82) to the shaft (84) of the steel roller (30). The bracket (82) is attached to the steel roller shaft (84) with a bearing. The shaft (84) is thus free to rotate with the steel roller (30) without applying a torque to the bracket (82). The small shaft (76) is solidly mounted in the bracket (82) preventing any rotational movement thereof.

Referring now to FIG. 5, it can be seen that the other end of the small shaft (76) is attached to a bracket (78) similar to bracket (82) shown in FIG. 4. Both brackets (78 and 82) are also attached to the steel roller shaft (84) shown in FIG. 4.

Referring now to FIG. 4, by attaching steel rollers (86) to the small shaft (76) so that they can roll with the paper roll (2), the whole sensor assembly acts as a floating head to keep the emitter (15), the detector (17) and the C-clamp bracket (53) always at a proper distance from the roll (2).

Referring now to FIG. 5, the tachometer (40) is attached to the swing arm (32) by a bracket (72). The bracket (72) is for preventing the tachometer (40) to rotate with the steel roller (30) as it is in turn driven by the paper roll (2). The rotation of the steel roller (30) is transferred to the shaft of the tachometer (40) through the universal joint (74). The parts (76 and 78) are for holding the optical sensors (12 and 14) shown in FIG. 4.

Referring now to FIG. 6, there is shown, according to a preferred embodiment, the electronic circuitry for reading the different electrical signals. Many different embodiments are possible and this one is shown only as an example. The tachometer (40) is attached to the steel roller (30). The electrical output signal of the tachometer (40) is supplied to the input of a counter (60). Every time the roller (30) rotates, the tachometer (40) sends pulses to the counter (60) increasing its value and thus its output by the number of pulses received. The output the counter (60) is binary and is connected to latches (62 and 64). These latches (62 and 64) are for memorising the output value of the counter (60) at the exact moment the corresponding latch trigger inputs is activated and then the CPU (18) or any type of processor can read contents thereof. Those latch trigger inputs are activated by the optical sensors (12 and 14) shown in FIG. 3. At the detection of a first notch edge, one of the optical sensors sends a pulse to the corresponding trigger latch (36) which then sends a pulse to its respective latch (62 or 64) and sets his own detection status flag output (68) to a positive state over the CPU bus (66). Once the status flag output is in the positive state, the CPU (18) detects it and can then read the corresponding latch content. After the reading of the latch, the CPU (18) resets the trigger latch by activating its clear input (70). This circuitry shown in FIG. 6 allows an asynchronous reading of the counter value by the CPU (18) after a notch detection.

Referring to FIGS. 2, 3, 4, 5 and 6, there is shown, according to a preferred embodiment, the hardware parts of the apparatus for measuring the sheet stretch value of a sheet of paper roll (2) along its side diameter. These hardware parts comprise the support (6) onto which rests the paper roll (2); a vertical member (35) having upper and lower ends, the lower end being rigidly secured to the base plate (26); the swing arm (32) having first and second extremities, the first extremity being connected to the upper end of the vertical member (35); the steel roller (30) connected to the second end of the swing arm (32), the length of the steel roller (30) being slightly shorter than the length of the paper roll (2), the steel roller (30) resting on the paper roll (2); and two motor driven rollers (33) for pulling the sheet of paper from the roll (2), the rollers (33) being fixed to the vertical member (35).

Also, these hardware parts comprise the first optical sensor (12) for detecting the first notch edge of the paper sheet section between the roll (2) and the steel roller (30), and emitting a signal accordingly; the second optical sensor (14) for detecting the outermost peripheral notch edge of the paper roll (2), and emitting a signal accordingly; the tachometer (40) for detecting the rotation of the steel roller (30), and emitting a signal accordingly; first and second brackets (51 and 53), the first bracket (51) supporting the first sensor (12) and being fixed to the second extremity of the swing arm (32), the second bracket (53) supporting the second sensor (14) and being fixed to the second extremity of the swing arm (32); and the computer (41) for receiving the signals from the two sensors (12 and 14) and of the tachometer (40), for storing the signals and for calculating the corresponding sheet stretch value.

The apparatus described above can also be used for determining profile of sheet stretch values of the roll (2) with respect to diameter thereof. In that case, the apparatus further comprises sampling means, such as for example a sampler embodied by the CPU (18) for sampling several pairs of the passages detected by means of the first and second optical sensors (12 and 14); storing means, such as a memory (22) shown in FIG. 6 for storing values GAP calculated for the pairs of passages sampled by the sampler; second calculating means, as for example a second calculating unit, embodied by the CPU (18) for establishing a function F indicating profile of the values GAP with respect to diameter of the roll (2), from the values GAP stored in the memory (22).

In operation, the apparatus described in FIGS. 1 to 6, performs preferably the method generally shown in FIG. 7. The method is for determining at least one sheet stretch value of a roll (2) of material with respect to a corresponding diameter thereof. This method comprises the steps of (a) radially marking one side end of the roll from periphery thereof to produce a series of aligned marks (4) along a radius thereof; (b) supporting the roll in such a manner that it is free to rotate, thus allowing relaxation of peripheral layers thereof; (c) after steps (a) and (b), measuring a lateral shifting value GAP of one of the marks (4), which is the outermost in periphery of the roll (2), with respect to an adjacent mark (16); and (d) measuring the diameter of the roll (2). The value GAP is representative of the sheet stretch value of the roll at the diameter measured in step (d).

First, as described above, a side of the roll (2) is notched starting at the center of the roll (2) going toward the outside periphery. The notch size has to be large enough so that the relaxing movement of the sheet, which occurs only at the periphery of the roll (2), will not make the top notch sides overlap the ones directly under it. In order for the relaxing process to occur, the full weight of the paper roll (2) has to be supported by its central axis. When the notch has been made and the roll (2) has been placed on a support (6) equipped with bearings to permit free rotation of the roll, a movement of the outside layers is observed. As the sheet of paper is pulled, the outside layers keep shifting as the sheet relaxes. The distance or length of the shifting is the gap or stretch induced in the paper during the manufacturing process.

In a case where the marking is done by notching, in step (a), the marking comprises a step of radially notching one side end of the roll (2) from periphery thereof to produce a series of aligned notches (4) along a radius thereof. In step (c), the measuring comprises a step of measuring the lateral shifting value GAP of one (10) of the notches (4), which is the outermost in periphery of the roll (2), with respect to an adjacent notch (16).

Preferably, the step (c) comprises the steps of (i) unwinding a portion of the material which includes mark (10); (ii) detecting passage, at a first position, of mark (10) which is in the portion of material, and generating a signal A with respect to time accordingly; (iii) detecting passage, at a second position, of mark (16) which is immediately subsequent to mark (10) and located in periphery of the roll (2), and generating a signal B with respect to time accordingly; (iv) comparing signals A and B with respect to time to obtain a period of time $\Delta t$, determining which of the signals A and B occurred first and establishing a polarity value P accordingly; (v) measuring a length of material LM unwound during the period of time $\Delta t$; and (vi) calculating the value GAP by means of the following equation:

$$GAP = P*LM + OV,$$

where OV is an offset value determined by relative location of the first and second positions.

The steps (c) and (d) are repeated for several pairs of first and second marks as the roll (2) is unwound. The method further comprises the steps of (e) storing each of the values GAP calculated in step (vi) and establishing a function F indicating variations of the values GAP with respect to diameters of the roll (2) measured in step (d), the function F representing the profile of different sheet stretch values of the roll (2) of material with respect to diameter thereof.

In step (b), the roll (2) is being supported by a center axis thereof. Preferably, the method further comprises the step of calculating a percentage of stretch STR(%) for a corresponding diameter value of the roll (2) by means of the following equation:

In step (d), the diameter is measured by measuring a $$STR(\%) = \frac{[\text{said value gap}] * 100}{\pi * [\text{the corresponding diameter value of said roll}]}$$

length of material DM unwound during a period of time determined by two successive detections of a passage at the second position; and calculating the diameter by means of the following equation diameter=$DM/\pi$.

As described above the measurement method is quite simple. First, the length of paper DM which is measured between two successive notches corresponds to the circumference C of the roll (2).

$$C = \frac{\text{number of pulses read}} \times \frac{\text{steel roll diameter} \times \pi}{\text{pulses/revolution of steel roll}}$$

Then, the distance between the notch edges detected respectively by the first and second sensors (12 and 14) is measured. The measurement is started as soon as a notch edge is detected by one of said sensors (12 and 14), and stops when the other sensors (12 or 14) detects a notch edge. Then, the polarity P of the reading is set by determining which sensor (12 or 14) detected an edge first. If the second sensor (14) detects a notch first, the polarity P is positive and if the first sensor (12) detects a notch first the polarity P is negative.

To initialize measurement of the first and second sensors (12 and 14), an offset value OV is used. To evaluate this offset value, first, the gap is carefully measured by hand. Then, the gap value is measured by the following equation:

$$GAP\ value = P[(N1 \times ((D_1 \times \pi)/NP))] + OV,$$

where P is the polarity, N1 is a number of pulses generated by the tachometer (40) during the period of time occurring between detections made respectively by the first and second sensors (12 and 14), $D_1$ is the diameter of the steel roll (30), NP is the number of pulses per revolution of the steel roll (30), and OV is an offset value which is set to 0 during initialisation. The difference between the gap measured by hand and the gap value measured during initialisation is the offset value OV.

When the offset value OV is evaluated, a first gap value can be calculated by the above equation from subsequent readings of the first and second sensors, by replacing OV in the above equation by the offset value evaluated during initialisation. The only thing left to evaluate is the diameter of the roll (2) which is $C/\pi$.

The gap length and roll diameter are calculated for each revolution of the paper roll (2) so that the percentage of stretch STR(%) can be calculated for each revolution. The results are stored in the computer (41).

According to a preferred embodiment, the method for measuring the sheet stretch of a paper roll (2) along its side diameter comprises the following steps (A) notching radially one side of the roll (2) starting by the center thereof towards its periphery; (B) mounting the roll (2) on a support (6) provided with bearings (28) to support the full weight of the roll (2) by its center on each end so that the peripheral layers of paper can relax; (C) passing the last layer of paper around a steel roller (30) which is disposed at the periphery of the paper roll (2) and is parallel thereto; (D) unwinding the paper roll (2) so that it passes around the steel roller (30), by means of motor driven rollers (33); (E/ detecting the first notch edge in a paper layer as it is picked up by the steel roller (30) by means of a first optical sensor (12), and producing a signal A accordingly; (F) detecting the outermost peripheral notch edge of the paper roll (2) by means of a second optical sensor (14), and producing a signal B accordingly; (G) measuring circumference C of the paper roll (2) by attaching a tachometer (40) onto the steel roller (30) which has a known diameter $D_1$, the tachometer (40) generating typically 5000 pulses/(revolution of steel roller (30)), and by detecting a number of pulses N2 generated by the tachometer (40) during the period of time between two successive notches of peripheral layers of the paper roll (2), the circumference C being calculated by means of the following equation:

$$C=[N2\times((D_1\times\pi)/5000\ pulses)];$$

(H) calculating diameter $D_2$ of the paper roll (2) from value of C obtained in step (G) by means of the following equation:

$$D_2=(C/\pi);$$

(I) if an offset value has not been evaluated, evaluating an offset value OV during an initialisation procedure, the offset value OV resulting from the relative positions of the optical sensors (12 and 14); (J) calculating a gap value which is occurring between the signals A and B produced in said step (E) and (F), polarity P of the gap value being positive when the signal B occurs before the signal A, polarity P of the gap value being negative when the signal A occurs before the signal B, the gap value being calculated by means of the following equation:

$$GAP\ value=P[(N1\times((D_1\times\pi)/5000\ pulses))]+OV$$

where N1 is a number of pulses generated by the tachometer (40) during the period of time occurring between the signals A and B, P is the polarity of the gap value, and OV is the offset value calculated during the initialisation procedure; (K) calculating percentage of stretch STR(%) for the paper roll diameter $D_2$ by means of the following equation:

$$STR(\%)=[100\times(GAP\ value/(D_2\times\pi))],$$

and storing said value STR(%) associated with $D_2$; (L) repeating the method from step (D) until the paper roll (2) is completely unwound, whereby, when the paper roll (2) is completely unwound, the values of STR(%) are representative of the sheet stretch for different diameters $D_2$ of the paper roll (2).

Although the present invention has been described hereinabove by way of preferred embodiments thereof it should be pointed out that any modification to these preferred embodiments, within the scope of the appended claims, is not deemed to change or alter the nature and scope of the present invention.

What is claimed is:

1. Method for determining at least one sheet stretch value of a roll of material, comprising the steps of:
    (a) radially marking one side end of said roll from periphery thereof to produce a series of aligned marks along a radius thereof;
    (b) supporting said roll in such a manner that said roll is free to rotate, thus allowing relaxation of peripheral layers thereof; and
    (c) after said steps (a) and (b), measuring a lateral shifting value GAP of one of said marks, which is the outermost in periphery of said roll, with respect to an adjacent mark of said marks, said value GAP being representative of said sheet stretch value of the roll.

2. Method according to claim 1, for determining said at least one sheet stretch value of the roll with respect to a corresponding diameter thereof, further comprising step (d) of measuring the diameter of the roll, said value GAP being representative of said sheet stretch value of the roll at said diameter measured in the step (d).

3. Method according to claim 2, wherein:
    in said step (a), said marking comprises a step of radially notching said one side end of said roll from periphery thereof to produce a series of aligned notches along a radius thereof; and
    in said step (c), said measuring comprises a step of measuring said lateral shifting value GAP of one of said notches, which is the outermost in periphery of said roll, with respect to an adjacent notch of said notches.

4. Method according to claim 2 for determining profile of sheet stretch values of said roll with respect to diameter thereof, wherein:
    in said step (a), said one side end of said roll is marked from a center thereof to a periphery of the same;
    said step (c) comprises the steps of:
        (i) unwinding a portion of said material which includes said one mark;
        (ii) detecting passage, at a first position, of said one mark which is in said portion of material, and generating a signal A with respect to time accordingly;
        (iii) detecting passage, at a second position, of said second mark which is immediately subsequent to said one mark and located in periphery of said roll, and generating a signal B with respect to time accordingly;
        (iv) comparing said signals A and B with respect to time to obtain a period of time $\Delta t$, determining which of the signals A and B occurred first and establishing a polarity value P accordingly;
        (v) measuring a length of material LM unwound during said period of time $\Delta t$; and
        (vi) calculating said value GAP by means of the following equation:

$$GAP=P*LM+OV,$$

where OV is an offset value determined by relative location of said first and second positions;
    said steps (c) and (d) are repeated for several pairs of said first and second marks as said roll is unwound;
    said method further comprising the steps of (e) storing each of said values GAP calculated in said step (vi) and establishing a function F indicating variations of said values GAP with respect to said diameters of said roll measured in said step (d), said function F representing said profile of different sheet stretch values of said roll of material with respect to diameter thereof.

5. Method according to claim 4, wherein in said step (d), said diameter is measured by:
    measuring a length of material DM unwound during a period of time determined by two successive detections of a passage at said second position; and
    calculating said diameter by means of the following equation:

$$diameter=DM/\pi.$$

6. Method according to claim 2, wherein in said step (b) said roll is being supported by a center axis thereof.

7. Method according to claim 2, further comprising the step of (e) calculating a percentage of stretch STR(%) for a corresponding diameter value of said roll by means of the following equation:

$$STR(\%) = \frac{[\text{said value gap}] * 100}{\pi * [\text{the corresponding diameter value of said roll}]}.$$

8. Apparatus for determining at least one sheet stretch value of a roll of material, one side end of said roll being radially marked from periphery thereof to produce a series of aligned marks along a radius thereof, said apparatus comprising:

supporting means for supporting said roll in such a manner that said roll is free to rotate, thus allowing relaxation of peripheral layers thereof; and first measuring means for measuring a lateral shifting value GAP of one of said marks, which is the outermost in periphery of said roll, with respect to an adjacent mark of said marks, said value GAP being representative of the sheet stretch value of said roll.

9. Apparatus according to claim 8, further comprising a second measuring means for measuring the diameter of said roll, said value GAP being representative of the sheet stretch value of said roll at said diameter.

10. Apparatus according to claim 9, wherein:

said first measuring means comprise:

unwinding means for unwinding a portion of said material which includes said one mark;

first detecting means for detecting passage, at a first position, of said one mark which is in said portion of material, and producing a signal A with respect to time accordingly;

second detecting means for detecting passage, at a second position, of a second mark which is immediately subsequent to said one mark and located in periphery of said roll, and producing a signal B with respect to time accordingly;

comparing means for comparing said signals A and B with respect to time to obtain a period of time Δt, determining which of the signals A and B occurred first and establishing a polarity value P accordingly;

evaluating means for measuring a length of material LM unwound during said period of time Δt;

first calculating means for calculating said value GAP by means of the following equation:

$$GAP = P*LM + OV,$$

where OV is an offset value determined by relative location of said first and second positions; said apparatus further comprising:

sampling means for sampling several pairs of said passages detected by means of said first and second detecting means;

storing means for storing values GAP calculated for said pairs of passages sampled by said sampling means;

second calculating means for establishing a function F indicating profile of said values GAP with respect to diameter of said roll, from said values GAP stored in said storing means.

11. Apparatus according to claim 10, wherein said first measuring means comprise:

a roller having a given side diameter $D_1$, mountable onto a support so that, in operation, said roller is parallel to said roll, said unwound portion of material is disposed around at least a portion of said roller, and said roller is free to rotate thus allowing relaxation of peripheral layers thereof as said portion of material is unwound;

a tachometer connected to said roller, said tachometer generating a predetermined number of pulses NP for a complete rotation of said roller;

third detecting means connected to said first and second detecting means and to said tachometer, for detecting a number of pulses N1 generated by said tachometer during said period of time Δt;

a second calculating means for calculating said length LM of material by means of the following equation:

$$LM = N1*[(D_1*\pi)/NP].$$

12. Apparatus according to claim 11, wherein said second measuring means comprise:

fourth detecting means connected to said second detecting means and to said tachometer, for detecting a number of pulses N2 generated by said tachometer during a period of time Δt determined by two successive detections of a passage at said second position;

third calculating means for calculating the diameter $D_2$ of said roll, by means of the following equation:

$$D_2 = [(N2*D_1)/NP].$$

13. Apparatus according to claim 12, where the one side end of said roll is radially notched from periphery thereof to produce a series of aligned notches along the radius thereof, wherein:

said first and second detecting means comprise respectively first and second optical sensors;

said third and fourth detecting means are provided by a computer comprising interface devices for receiving signals from optical sensors and from said tachometer, and with a memory;

said comparing means is provided by said computer;

said first, second and third calculating means are provided by said computer;

said sampling means is provided by said computer; and said storing means is provided by said memory.

14. Apparatus according to claim 10, where the one side end of said roll is radially notched from periphery thereof to produce a series of aligned notches along the radius thereof, wherein:

said first and second detecting means comprise respectively first and second optical sensors;

said comparing means are provided by a computer comprising interface devices for receiving signals from optical sensors and a memory;

said first and second calculating means are provided by said computer;

said sampling means are provided by said computer; and said storing means is provided by said memory.

15. Apparatus according to claim 9, wherein said support means comprise two parallel upright members mechanically connected by means of a base plate, each of said upright members having an upper section provided with a ball bearing for supporting a center axis of said roll, whereby, in operation, said roll is mounted between said upright members.

16. Apparatus according to claim 9, further comprising a calculating means for calculating a percentage of stretch STR(%) for a corresponding diameter value of said roll measured by said second measuring means by means of the following equation:

$$STR(\%) = \frac{[\text{said value gap}] * 100}{\pi * [\text{the corresponding diameter value of said roll}]}.$$

* * * * *